US011454956B2

(12) United States Patent
Sakumiya et al.

(10) Patent No.: US 11,454,956 B2
(45) Date of Patent: Sep. 27, 2022

(54) MANUFACTURING SUPPORT SYSTEM AND METHOD

(71) Applicant: OMRON Corporation, Kyoto (JP)

(72) Inventors: Akio Sakumiya, Kyoto (JP); Hiroyuki Miyaura, Kyoto (JP); Michie Uno, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/643,517

(22) PCT Filed: Sep. 1, 2017

(86) PCT No.: PCT/IB2017/001062
§ 371 (c)(1),
(2) Date: Feb. 28, 2020

(87) PCT Pub. No.: WO2019/043425
PCT Pub. Date: Mar. 7, 2019

(65) Prior Publication Data
US 2020/0363791 A1 Nov. 19, 2020

(51) Int. Cl.
*G05B 19/418* (2006.01)
(52) U.S. Cl.
CPC .......... *G05B 19/41865* (2013.01); *G05B 2219/32099* (2013.01); *G05B 2219/33002* (2013.01)
(58) Field of Classification Search
CPC .......... G05B 2219/33002; G05B 2219/35204; G05B 2219/32099; G05B 19/41865; G05B 2219/32258
See application file for complete search history.

(56) References Cited

U.S. PATENT DOCUMENTS 6,999,831 B2 * 2/2006 Hayashi ........... G05B 19/41865
700/96
7,174,232 B2 * 2/2007 Chua ..................... G06Q 10/06
700/102
(Continued)

FOREIGN PATENT DOCUMENTS

JP H03-127202 5/1991
JP 2002-073140 3/2002
(Continued)

OTHER PUBLICATIONS

Chang et al., "An integrated artificial intelligent computer-aided process planning system," *International Journal of Computer Integrated Manufacturing*, vol. 13, No. 6, Jan. 1, 2000, pp. 483-497.
(Continued)

*Primary Examiner* — Jacob J Cigna
*Assistant Examiner* — Michael W Hotchkiss
(74) *Attorney, Agent, or Firm* — Klarquist Sparkman, LLP

(57) ABSTRACT

A manufacturing support system may be provided. The manufacturing support system may comprise: an obtaining unit (IO) configured to obtain object data of an object to be manufactured; an artificial intelligence, Al, engine (20) configured to receive the object data as an input and to determine a hardware configuration of a manufacturing system for manufacturing the object with reference to information relating to available hardware for the manufacturing system; and an output unit (60) configured to output the determined hardware configuration.

15 Claims, 12 Drawing Sheets

(56) References Cited

U.S. PATENT DOCUMENTS

| | | | | |
|---|---|---|---|---|
| 7,668,614 | B2* | 2/2010 | Govind | G06Q 10/06 |
| | | | | 702/182 |
| 9,618,926 | B1* | 4/2017 | Louette | G05B 19/18 |
| 10,783,469 | B2* | 9/2020 | Zheng | G06Q 10/06315 |
| 10,860,950 | B2* | 12/2020 | Chu | G06N 20/00 |
| 10,921,782 | B2* | 2/2021 | Mehr | G06N 20/00 |
| 2005/0251284 | A1 | 11/2005 | Balic | |
| 2017/0300037 | A1* | 10/2017 | Platts | G06Q 50/04 |
| 2018/0365065 | A1* | 12/2018 | Guttmann | G06F 7/14 |
| 2019/0271966 | A1* | 9/2019 | Coffman | G06F 30/27 |

FOREIGN PATENT DOCUMENTS

| | | |
|---|---|---|
| JP | 2006-059170 | 3/2006 |
| JP | 2012-048512 | 3/2012 |
| JP | 2013-171481 | 9/2013 |
| JP | 2016-009351 | 1/2016 |
| JP | 2017-146910 | 8/2017 |

OTHER PUBLICATIONS

Park et al., "Explanation-Based learning for Intelligent Process Planning," *IEEE Transactions on Systems, Man and Cybernetics*, IEEE, New York, US, vol. 23, No. 6, Nov. 1, 1993, pp. 1597-1616.

Wang et al., "Ann Based Process Control in Manufacturing," *Proceedings of the American Control Conference*, San Francisco, Jun. 2-4, 1993, vol. 3, 3 pages.

International Search Report and Written Opinion, PCT/IB2017/001062, dated May 4, 2018, 12 pages.

International Preliminary Report on Patentability, PCT/IB2017/001062, dated Nov. 20, 2019, 22 pages.

Office Action received in counterpart Japan Patent Application No. 2020-512577, dated Oct. 5, 2021, with English translation, 12 pages.

Office Action (w/English translation) received in counterpart Japanese patent application No. 2020-512577, dated Apr. 5, 2022, 8 pages.

Examination Report received in European Patent Application No. 17777947.7 dated Nov. 10, 2021, 11 pages.

Chan, "Feature Based Reverse Engineering Employing Automated Multi-Sensor Scanning," Jan. 1, 1999, http://dspace.library.uvic.ca/bitstream/handle/1828/8860/Chan_VincentHarry_PhD_1999.pdf, 154 pages.

BenKhalifa et al., Integrated neural networks approach in CAD/CAM environment for automated machine tools selection, Journal of Mechanical Engineering Research, vol. 2(2), pp. 25-38, Mar. 2010, 14 pages.

* cited by examiner

| Machine | | Tool 1 | | Tool 2 | | ... |
|---|---|---|---|---|---|---|
| Type | Model / ID | Type | Model / ID | Type | Model / ID | ... |
| NC Lathe | A001 | Cutting Tool | KA012 | Drill | DA123 | ... |
| NC Lathe | A002 | Cutting Tool | KB023 | Drill | DB012 | ... |
| ... | ... | ... | ... | ... | ... | ... |
| Hobbing Machine | B001 | Hob | HA015 | Hob | HB011 | ... |
| ... | ... | ... | ... | ... | ... | ... |
| Chamfering Machine | C001 | Chamfering Cutter | MA103 | Chamfering Cutter | MB056 | ... |
| ... | ... | ... | ... | ... | ... | ... |

Fig. 2

| Manufacturing Process Step | Parameter Set | Machine - Tool Combination |
|---|---|---|
| Cutting | CUP1 | A001 - KA012 |
| ⋮ | ⋮ | ⋮ |
| Cutting | CUPN | A002 - KB023 |
| Drilling | DRP1 | A002 - DB012 |
| ⋮ | ⋮ | ⋮ |
| Drilling | DRPM | A001 - DA123 |
| Gear Machining - Hobbing | HOP1 | B001 - HB011 |
| Gear Machining - Chamfering | CHP1 | C001 - MA103 |
| ⋮ | ⋮ | ⋮ |

Fig. 3

| Manufacturing Process Step | Machine | Tool | Machining Conditions |
|---|---|---|---|
| Cutting | NC Lathe | Cutting Tool | • Cutting speed (rotational speed of a workpiece)<br>• Feed speed of the cutting tool<br>• Cutting depth |
| Drilling | NC Lathe | Drill | • Cutting speed (rotational speed of a workpiece)<br>• Feed speed of the cutting tool<br>• Drilling depth |
| Hobbing | Hobbing Machine | Hob | • Cutting speed (rotational speed of the hob axis)<br>• Feed speed of the hob |
| Tooth Chamfering | Gear Tooth Chamfering Machine | Chamfering Cutter | • Cutting spped (rotational speed of the cutter axis)<br>• Feed speed of the cutter |
| Shaving | Gear Shaving Machine | Shaving Cutter | • Rotational speed of the cutter<br>• Crossing angle of the cutter axis and the gear axis<br>• Feed speed |

Fig. 12

MANUFACTURING SUPPORT SYSTEM AND METHOD

CROSS REFERENCE TO RELATED APPLICATIONS

This is the U.S. National Stage of International Application No. PCT/IB2017/001062, filed Sep. 1, 2017, which was published in English under PCT Article 21(2), which is hereby incorporated herein by reference in its entirety.

The application relates to supporting manufacturing of an object such as a gear.

BACKGROUND

A manufacturing system for manufacturing an object may be configured by an operator based on his/her experiences. The configuration of the manufacturing system may include, for example, selection of necessary hardware such as machining devices and/or tools, operation conditions for such hardware, and/or generation of control programs of such hardware.

Artificial intelligence (AI) have been used for supporting manufacturing and/or machining an object. For example, JP 2017-33138A and JP 2017-62695A disclose a machining device that comprises: a motion evaluation unit configured to evaluate a motion of the machining device and to output evaluation data; and a machine learning device configured to learn a travel amount of an axis of the machining device. The machine learning device disclosed in JP 2017-33138A is configured to learn adjustment of the travel amount of the axis of the machining device based on adjusted travel among of the axis, physical amount data of the machining device and reward data calculated based on the physical amount data and the evaluation data. The machine learning device disclosed in JP 2017-62695A is configured to learn determination of the travel amount of the axis of the machining device based on determined travel amount of the axis, status data of the machining device and a reward calculated based on the status data.

Further, for example, JP 2017-30152A discloses an injection molding system comprising: a state observation section for observing, when injection molding is performed, physical amounts relating to the performing injection molding; a physical-amount data storage section for storing the physical-amount data; a reward-conditions setting section for setting reward conditions for machine learning; a reward calculation section for calculating a reward based on the physical-amount data and the reward conditions; an operating-conditions adjustment learning section for performing machine learning for adjusting operating conditions based on the reward calculated by the reward calculation section, the operating-conditions adjustment, and the physical-amount data; a learning-result storage section for storing a learning result of the machine learning by the operating-conditions adjustment learning section; and an operating-conditions adjustment-amount output section for determining and outputting an operating condition to be adjusted and an adjustment amount based on the machine learning by the operating-conditions adjustment learning section.

In some circumstances, it is desirable to facilitate selection of hardware necessary for manufacturing an object so as to improve overall efficiency of the manufacturing process.

SUMMARY

According to an aspect, a manufacturing support system is provided. The manufacturing support system may comprise the following:

an obtaining unit configured to obtain object data (such as object shape data, particularly 3D object data) of an object to be manufactured;

an artificial intelligence, AI, engine configured to receive the object data as an input and to determine a hardware configuration of a manufacturing system for manufacturing the object with reference to information relating to available hardware for the manufacturing system; and an output unit configured to output the determined hardware configuration.

In some circumstances, the manufacturing support system according to various aspects of the present disclosure may contribute to efficient determination of a hardware configuration of a manufacturing system, leading to improvement of overall efficiency of manufacturing process for manufacturing an object to be manufactured.

In some examples, the AI engine may be further configured to determine manufacturing process steps to be carried out by the manufacturing system for manufacturing the object, and the output unit may be further configured to output the determined manufacturing process steps.

Further, the AI engine may be further configured to determine a value or a value range for a parameter relating to each of one or more steps included in the manufacturing process steps, and the output unit may be further configured to output the determined value or value range.

In some examples, the information relating to available hardware for the manufacturing system may include information indicating, for at least part of possible manufacturing process steps, at least one hardware element that is available and that is required to perform the manufacturing process step, wherein the AI engine may comprise:
    a machine learning device that is configured to:
        receive the object data as an input;
        perform computation using the received object data; and
        output information indicating at least one set of manufacturing process steps for manufacturing the object based on the computation; and
    a hardware information processing unit that is configured to determine the hardware configuration of the manufacturing system by identifying, with reference to the information relating to available hardware, at least one hardware element required to perform each of one or more steps included in said at least one set of manufacturing process steps for manufacturing the object.

In these examples, manufacturing process steps for manufacturing an object may be determined by an AI while a hardware configuration for the manufacturing system may be determined with reference to information relating to available hardware that may be, for example, stored beforehand in a database. Thus, in some circumstances, when any change to the available hardware has been made, the information stored in the database relating to the available hardware may be updated and the determination of the hardware configuration can be performed without re-training the AI with regards to the change to the available hardware. This may contribute to improved efficiency in determining the hardware configuration, thereby improving overall efficiency of the manufacturing process.

Regarding the above-stated examples where the AI engine may comprise the machine learning device and the hardware information processing unit, the machine learning device may comprise a neural network configured to perform the computation using the received object data, wherein the neural network has been trained using training data including object data of one or more objects and information indicating sets of manufacturing process steps for manufacturing the one or more objects. Training of the neural network may be performed according to deep learning technique.

Regarding the aspect and various examples as stated above, the information relating to available hardware may include information indicating an operation schedule for available hardware elements,
    wherein the AI engine may be configured to determine more than one hardware configuration,
    wherein the manufacturing support system may further comprise:
        a selection unit configured to select one of said more than one hardware configuration based on a required delivery time for the object and the operation schedule, and
    wherein the output unit may be configured to output the selected one of said more than one hardware configuration.

Further, the AI engine may be further configured to determine priorities among said more than one hardware configuration, and the selection unit may be configured to select one of said more than one hardware configuration further based on the priorities among said more than one hardware configuration.

Regarding the aspect and various examples as stated above, the manufacturing support system may further comprise: a control information generation unit configured to generate control information for controlling the manufacturing system with the determined hardware configuration based on the object data and/or the determined hardware configuration.

According to another aspect, a computer-implemented method is provided for supporting manufacturing. The method may comprise the following:
    obtaining object data (such as object shape data, particularly 3D object data) of an object to be manufactured;
    receiving, by an artificial intelligence, AI, engine, the object data as an input;
    determining, by the AI engine, a hardware configuration of a manufacturing system for manufacturing the object with reference to information relating to available hardware for the manufacturing system; and
    outputting the determined hardware configuration.

In some examples, the method according to the above aspect may further comprise:
    determining, by the AI engine, manufacturing process steps to be carried out by the manufacturing system for manufacturing the object; and
    outputting the determined manufacturing process steps.

Further, the method according to the above aspect and examples may further comprise:
    determining, by the AI engine, a value or a value range for a parameter relating to each of one or more steps included in the manufacturing process steps; and
    outputting the determined value or value range Regarding the method according to the above-stated examples, the information relating to available hardware for the manufacturing system may include information indicating, for at least part of possible manufacturing process steps, at least one hardware element that is available and that is required to perform the manufacturing process step,
    wherein said determining of the manufacturing process steps may be performed by a machine learning device comprised in the AI engine, said determining of the manufacturing process steps may comprise:
        receiving the object data as an input;
        performing computation using the received object data; and
        outputting information indicating at least one set of manufacturing process steps for manufacturing the object based on the computation, and
    wherein said determining of the hardware configuration of the manufacturing system may be performed by identifying, with reference to the information relating to available hardware, at least one hardware element required to perform each of one or more steps included in the at least one set of manufacturing process steps for manufacturing the object.

Further, the machine learning device may comprise a neural network configured to perform the computation using the received object data,
    wherein the method may further comprise:
        training the neural network using training data including object data of one or more objects and information indicating sets of manufacturing process steps for manufacturing the one or more objects, and
    wherein said training of the neural network may be performed according to deep learning technique.

Regarding the method according to the aspect and various examples as stated above, the information relating to available hardware may include information indicating an operation schedule for available hardware elements,
    wherein more than one hardware configuration may be determined by the AI engine,
    wherein the method may further comprise:
        selecting one of said more than one hardware configuration based on a required delivery time for the object and the operation schedule, and
    wherein the selected one of said more than one hardware configuration may be output as the determined hardware configuration.

Further, the AI engine may further determine priorities among said more than one hardware configuration, and said selecting one of said more than one hardware configuration may be further based on the priorities among said more than one hardware configuration.

Moreover, the method according to the aspect and various examples as stated above may further comprise: generating control information for controlling the manufacturing system with the determined hardware configuration based on the object data and/or the determined hardware configuration.

Further, the method according to the aspect and various examples as stated above may further comprise:
    obtaining information relating to a material, processing and/or a size of the object to be manufactured,
    wherein the AI engine may further receive the information relating to the material, the processing and/or the size of the object to be manufactured, and
    wherein the AI engine may determine the hardware configuration of the manufacturing system further using the information relating to the material, the processing and/or the size of the object to be manufactured.

According to yet another aspect, a computer program is provided. The computer program product may comprise computer-readable instructions that, when loaded and run on a computer, cause the computer to perform the steps of the method according to any one of the method according to the aspect and various examples as stated above.

According to yet another aspect, a device is provided for training an AI configured to: (i) receive object data of an object to be manufactured; (ii) perform computation using the received object data; and (iii) output information indicating at least one set of manufacturing process steps for manufacturing the object based on the computation.

The device may comprise:
an AI training unit configured to train the AI using training data including object data of one or more objects and information indicating sets of manufacturing process steps for manufacturing the one or more objects.

According to yet another aspect, a computer-implemented method is provided for training an AI configured to: (i) receive object data of an object to be manufactured; (ii) perform computation using the received object data; and (iii) output information indicating at least one set of manufacturing process steps for manufacturing the object based on the computation. The method may comprise:
training the AI using training data including object data of one or more objects and information indicating sets of manufacturing process steps for manufacturing the one or more objects.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

FIG. 2 shows an example of data stored in a hardware information database (DB).

FIG. 3 shows further example of data stored in the hardware information DB.

FIG. 12 shows an example of output data of the manufacturing support system according to another exemplary embodiment.

DETAILED DESCRIPTION OF EMBODIMENTS

In the following text, a detailed description of examples will be given with reference to the drawings. It should be understood that various modifications to the examples may be made. In particular, elements of one example may be combined and used in other examples to form new examples.

Exemplary embodiments and various examples described herein relate to supporting manufacturing of an object by obtaining object data of the object to be manufactured and determining a hardware configuration of a manufacturing system for manufacturing the object, using artificial intelligence (AI), from the obtained object data with reference to information relating to available hardware for the manufacturing system.

Functional Configurations of the Manufacturing Support System

Figure 1:
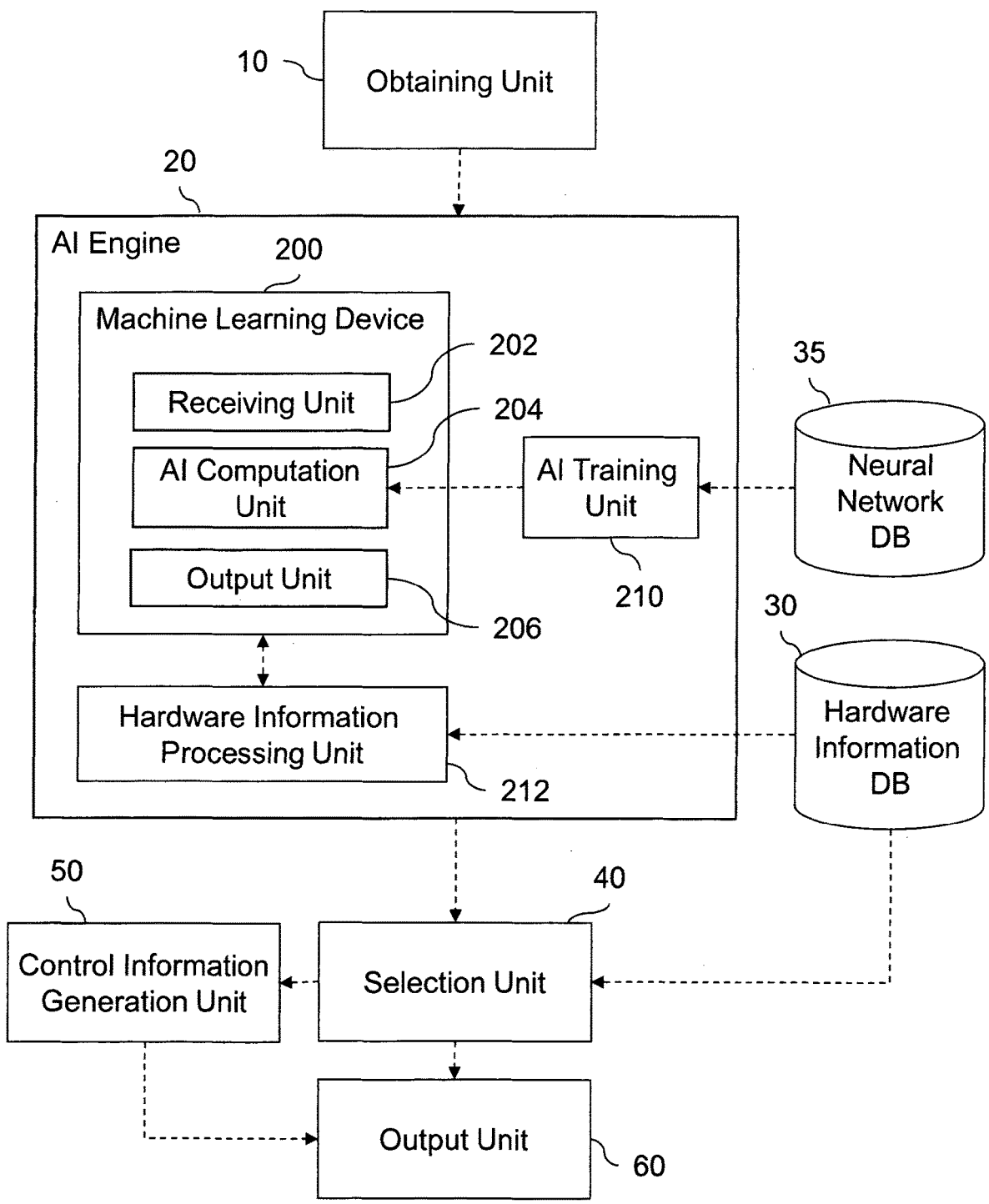
FIG. 1 shows a functional block diagram of an example of a manufacturing support system according to an exemplary embodiment.

FIG. 1 shows a functional block diagram of an example of a manufacturing support system according to an exemplary embodiment.

As shown in FIG. 1, the manufacturing support system may comprise a obtaining unit 10, an AI engine 20, a hardware information DB 30, a neural network DB 35, a selection unit 40, a control information generation unit 50 and/or an output unit 60.

The obtaining unit 10 may be configured to obtain object data (such as object shape data, particularly 3D object data) of an object to be manufactured. The object to be manufactured may be any object that can be manufactured by, for example, machining, molding, casting, heat treatment and/or surface finishing. In the following, embodiments and examples will be described with respect to a case where the object to be manufactured is a gear. A gear may be manufactured by a machining process including, for example, steps of cutting, drilling, hobbing, chamfering and/or shaving. It should be noted, however, that a person skilled in the art readily understands that various embodiments and examples described herein may be applicable for manufacturing objects other than gears by a manufacturing process including steps other than machining steps.

The object data may be, for example, image data of an object, such as a gear, to be manufactured. The image data may include a 2D image array of pixels, each of the pixels including at least one value. For instance, a pixel in grey scale image data may include one value indicating an intensity of the pixel. A pixel in color image data may include multiple values, for example three values, that indicate coordinates in a color space such as RGB color space. The image data may be generated by an imaging device such as a camera that comprises, e.g., a CCD (charge-coupled device) sensor, and is configured to capture one or more images of a scene.

Another example of the object data may be a combination of 2D image data and corresponding depth map data of an object, such as a gear, to be manufactured. The 2D image data may be generated by an imaging device such as a camera, as mentioned above with respect to the object data being image data. The corresponding depth map data may include a value for each pixel in the 2D image data, the value indicating a distance of a surface of an object in the 2D image at the corresponding pixel from a viewpoint. The depth map can be generated using known 3D reconstruction techniques, e.g., a multi-view stereo method in which depth information is reconstructed by identifying a same point in at least two images of a scene, captured from different viewpoints.

In a specific example of the object data being a combination of 2D image data and corresponding depth map data, the object data may be RGB-D (RGB and depth) data. RGB-D data may be captured by RGB-D sensors such as Microsoft Kinect and ASUS Xtion Pro Live, which comprise an optical camera and structured-light depth sensors.

Another specific example of the object data may be 2D image data with a structured light projections, where structured light is projected onto an object to be manufactured or a model of that object under a predetermined illumination angle. The structure of the illuminated parts of the object in a 2D image taken under a predetermined imaging angle (relative to the illumination angle) represents the (3D) shape of the illuminated object.

Yet another example of the object data may be a 3D model of an object, such as a gear, to be manufactured. The 3D model may include mathematical representation of any surface of the object in three dimensions. For instance, the 3D model may include representation of a physical body of the object using a collection of points in 3D space, connected by various geometric entities such as triangles, lines, curved surfaces, etc. In a specific example, the object data may be 3D CAD (computer aided design) model. The 3D model may be generated using known software for 3D modelling such as AutoCAD, Blender, FreeCAD, etc. Further, in some examples, the 3D model may be generated by a known 3D scanner.

The type of the object data may be chosen according to which type of input data the AI engine 20 requires.

The obtaining unit 10 may obtain the object data from a computer (not shown) or a storage device (not shown) connected to the obtaining unit 10.

Alternatively, the obtaining unit 10 may be configured to generate the object data. For example, in case the object data is image data of an object, the obtaining unit 10 may be implemented by an imaging device such as a camera. Further, for example, in case the object data is a 3D model of an object, the obtaining unit 10 may be implemented by a known 3D scanner or by a computer on which known software for 3D modelling is installed. Further, for example, in case the object data is a combination of 2D image data and corresponding depth map data, the obtaining unit 10 may comprise RGB-D sensors configured to capture RGB-D data of the object to be manufactured. In other examples, the obtaining unit 10 may comprise an imaging device such as a camera to capture one or more images of the object and a system configured to obtain depth map data according to, e.g. a multi-view stereo method, as mentioned above.

In any case, the obtaining unit 10 may be further configured to process the object data to be suitable as an input to the AI engine 20, if necessary.

The AI engine 20 may be configured to receive, from the obtaining unit 10, the object data as an input. The AI engine 20 may be further configured to determine a hardware configuration of a manufacturing system (not shown) for manufacturing the object with reference to information relating to available hardware for the manufacturing system. As shown in FIG. 1, the AI engine 20 may comprise a machine learning device 200, an AI training unit 210 and/or a hardware information processing unit 212.

The machine learning device 200 may comprise a receiving unit 202, an AI computation unit 204 and an output unit 206. The receiving unit 202 may be configured to receive the object data as an input. In some examples, the receiving unit 202 may be further configured to receive information that can be used in computation performed by the AI computation unit 204. For instance, the receiving unit 202 may further receive information relating to a material, processing and/or a size of the object to be manufactured. The information relating to a material of the object to be manufactured may indicate, for example, a name of the material and/or characteristics of the material such as color, stiffness, relative density, heat resistance, etc. The information relating to processing of the object to be manufactured may indicate, for example, how a surface of the object is machined and/or treated, how the material is processed (e.g. sintering, soldering, welding etc.), how elements of the object are assembled, etc. The information relating to a size of the object may indicate, for example, an overall length, width, thickness, height, and/or diameter of at least a part of the object. The further information relating to a material, processing and/or a size of the object to be manufactured may be input by a user via an input device (not shown) or may be obtained from a computer (not shown) and/or a storage device (not shown) connected to the AI engine 20.

The AI computation unit 204 may be configured to perform computation of an AI. In other words, the AI computation unit 204 may be understood as a unit implementing an AI. Specifically, in the examples described herein, the AI computation unit 204 may be configured to perform computation using the received object data. In case the receiving unit 202 receives further information relating to a material, processing and/or a size of the object to be manufactured, the AI computation unit 204 may be configured to perform computation using not only the received object data but also the further information relating to a material, processing and/or a size of the object. The computation performed by the AI computation unit 204 may be based on a known machine learning technique, for example, a technique involving neural networks. Detailed examples of the AI computation unit 204 will be described later herein. Based on the computation performed by the AI computation unit 204, at least one set of manufacturing process steps for manufacturing the object may be determined.

The output unit 206 may be configured to output information indicating at least one set of manufacturing process steps for manufacturing the object, based on the computation performed by the AI computation unit 204. For instance, in case the object to be manufactured is a spur gear, a set of manufacturing process steps output by the output unit 206 may include a cutting step, a drilling step, a hobbing step, a chamfering step and a shaving step.

In some examples, the output unit 206 may be further configured to output information indicating value(s) and/or value range(s) of one or more parameters relating to each of one or more steps included in the set of manufacturing process, based on the computation performed by the AI computation unit 204. For example, regarding a cutting step, a value range of the depth of the cut may be output as a parameter value range. Further, for example, regarding a drilling step, value ranges of the depth and the diameter of the hole may be output as parameter value ranges.

It is noted that, depending on the type of the object to be manufactured (e.g., the type of the gear such as a spur gear, helical gear, internal gear etc.), appropriate set of manufacturing process steps and/or the value(s) and/or value range(s) of one or more parameters relating to one or more of the steps may vary. This variation of the manufacturing process steps may result in variation of the hardware configuration necessary for carrying out the set of manufacturing process steps by the manufacturing system.

The AI training unit 210 may be configured to train the AI implemented by the AI computation unit 204 of the machine learning device 200. For example, the AI training unit 210 may be configured to train the AI implemented by the AI computation unit 204 for determining at least one set of manufacturing process steps to manufacture the object. Further, for example, the AI training unit 210 may be configured to train the AI implemented by the AI computation unit 204 for determining, in addition to the at least one set of manufacturing process steps, value(s) and/or value range(s) of one or more parameters relating to each of one or more steps included in the set of manufacturing process.

In some examples, the AI training unit 210 may be configured to obtain a data structure of a neural network from the neural network DB 35 and train the neural network for determining at least one set of manufacturing process steps to manufacture the object.

The neural network DB 35 may be a database storing data structures of neural networks with various configurations. For example, the neural network DB 35 may store the data structures of neural networks having an input layer with various numbers of nodes, one or more hidden layers with various numbers of nodes, an output layer with various numbers of nodes and various weighted connections between nodes. Further, for example, the neural network DB 35 may store the data structures of the neural networks such as an autoencoder and a convolutional neural network (CNN) as will be explained later with reference to FIGS. 4A to 7. The neural networks stored in the neural network DB 35 may not have been trained for any specific purpose.

In some examples, the AI training unit 210 may be included in a device other than the manufacturing support system and does not need to be included in the AI engine 200.

The hardware information processing unit 212 may be configured to determine the hardware configuration of the manufacturing system by identifying, with reference to the hardware information DB 30, at least one hardware element required to perform each of one or more steps that are included in the at least one set of manufacturing process steps for manufacturing the object.

The hardware information DB 30 may store information concerning hardware elements that are available for the manufacturing system. For example, the hardware information DB 30 may store information indicating, for at least part of possible manufacturing process steps, a hardware element or a combination of hardware elements that is available and that is required to perform the manufacturing process step. The available hardware elements may be, for example, hardware elements that are present in a factory in which the manufacturing system is installed. The hardware elements for the manufacturing system may include, but are not limited to, machining devices such, as NC (numerical control) lathes, hobbing machines, chamfering machines, shaving machines, drilling machines, milling machines, electrical discharge machines (EDM) as well as tools used in the machining devices, e.g. cutting tools, drilling tools, hobs, chamfering cutters, shaving cutters, jigs etc.

FIG. 2 shows an example of information that may be stored in the hardware information DB 30. As shown in FIG. 2, the hardware information DB 30 may comprise a table including information on available machines and on available tools for each machine. In the table shown in FIG. 2, each row of the table corresponds to a machine and includes the type of the machine, model/ID (identification information) of the machine as well as type and model/ID of tools that may be used in the machine. For example, according to the table shown in FIG. 2, a cutting tool of model/ID "KA012" and a drill of model/ID "DA123" can be used in an NC lathe of model/ID "A001".

FIG. 3 shows a further example of information that may be stored in the hardware information DB 30. More specifically, FIG. 3 shows an example of information indicating, for at least part of possible manufacturing process steps, at least one hardware element that is available and that is required to perform the manufacturing process step. In the exemplary table shown in FIG. 3, the first column indicates possible manufacturing steps and the second column indicates possible parameter sets corresponding to the manufacturing steps. In the exemplary table of FIG. 3, the parameter sets are indicated by identification information of specific sets of parameters. The hardware information DB 30 may store specific value(s) and/or value range(s) of parameters included in the parameter set identified by each identification information as shown in the exemplary table of FIG. 3. Further, the third column of the exemplary table shown in FIG. 3 indicates combinations of a machine and a tool necessary for performing respective manufacturing steps with the parameter sets. For example, according to the table shown in FIG. 3, the cutting step with the parameter set "CUP1" requires a combination of the machine "A001" and the tool "KA012".

The hardware information DB 30 may further store an operation schedule for available hardware elements. The operation schedule may indicate which hardware element is currently ready for use and/or will be ready for use at which point of time. Alternatively or additionally, the operation schedule may indicate which hardware element is currently in use and/or will be in use in which time period and/or which hardware element is currently under maintenance work and/or will be under maintenance work in which time period. The operation schedule may further indicate which hardware element is or will be ready for use until which point of time.

Referring again to FIG. 1, the hardware information processing unit 212 may determine hardware configuration of the manufacturing system by identifying, with reference to an information table stored in the hardware information DB 30 such as the one shown in FIG. 3, a combination of hardware elements required to perform each of one or more steps included in the at least one set of manufacturing process steps for manufacturing the object, output by the machine learning device 200. For example, suppose that the hardware configuration information DB 30 stores the exemplary table shown in FIG. 3 and that the machine learning device 200 has output a set of manufacturing process steps including a cutting step with a parameter set "CUP1", a drilling step with a parameter set "DRPM", a hobbing step with a parameter set "HOP1" and a chamfering step with a parameter set "CHP1". In this example, the hardware information processing unit 212 may identify a machine-tool combination of "A001-KA012" for the cutting step, "A001-DA123" for the drilling step, "B001-HB011" for the hobbing step and "C001-MA103" for the chamfering step. The determined hardware configuration may include these machine-tool combinations "A001-KA012", "A001-DA123", "B001-HB011" and "C001-MA103" identified for the manufacturing process steps.

In some examples, the AI engine 20 may determine more than one hardware configuration for manufacturing the object. For instance, the machine learning device 200 may determine more than one set of manufacturing process steps for manufacturing the object. In such a case, the hardware information processing unit 212 may determine more than one hardware configuration, each corresponding to one of said more than one set of manufacturing process steps.

Further, in the examples where the AI engine 20 determines more than one hardware configuration, the AI engine 20 may further determine priorities of the more than one hardware configuration. In other words, the AI engine 20 may determine which one of the more than one hardware configuration is more preferable and/or recommendable than the others.

In case the AI engine 20 determines more than one hardware configuration for manufacturing the object, the selection unit 40 may be configured to select one of said more than one hardware configuration based on a required delivery time for the object and the operation schedule for available hardware elements. When the AI engine 20 further determines the priorities of the more than one hardware configuration, the selection made by the selection unit 40 may further be based on the priorities of the more than one hardware configuration. The required delivery time may be input by a user using an input device (not shown) or obtained from a computer (not shown) or a storage device (not shown) connected to the selection unit 40. The operation schedule may be obtained from the hardware information DB 30. The selection unit 40 may provide the selected hardware configuration to the control information generation unit 50 and/or to the output unit 60.

It is noted that the selection unit 40 is an optional unit for the manufacturing support system. For example, in case the AI engine 20 is configured to determine only one hardware configuration for the manufacturing system, the manufacturing support system is not required to comprise the selection unit 40.

The control information generation unit 50 may be configured to generate control information for controlling the manufacturing system with the determined hardware configuration, based on the object data and/or the determined hardware configuration. The control information may include, for example, values of control parameters for controlling operation of the manufacturing system with the determined hardware configuration. The control parameters may represent operation conditions of the hardware elements included in the selected hardware configuration. Alternatively or additionally, the control information may include a control program for the hardware elements included in the selected hardware configuration. The control information generation unit 50 may provide the generated control information to the output unit 60.

The control information generation unit 50 is also an optional unit for the manufacturing support system.

The output unit 60 may be configured to output the selected hardware configuration provided by the selection unit 40 and/or the generated control program provided by the control information generation unit 50. In case the manufacturing support system does not include the selection unit 40, the output unit 60 may be configured to receive from the AI engine 20 a hardware configuration determined by the AI engine 20 and to output the received hardware configuration.

According to the exemplary manufacturing support system as described above with reference to FIG. 1, at least one set of manufacturing process steps may be determined by the machine learning device 200 using the AI computation unit 204 and a hardware configuration is determined by the hardware information processing unit 212, based on the at least one set of manufacturing process steps with reference to the information stored in the hardware information DB 30 concerning one or more hardware elements required for performing each of one or more steps included in the at least one set of manufacturing process steps (see e.g. the exemplary table shown in FIG. 3). Accordingly, when any change is made to the available hardware elements, the hardware information DB 30 may be updated to reflect the change and then the hardware configuration determined by the AI engine 20 may also reflect the change. In such a case, no re-training of the AI implemented by the AI computation unit 204 with regards to the change to the available hardware may be necessary since the AI computation unit 204 does not necessarily require the information stored in the hardware information DB 30. This may contribute to improved efficiency in determining the hardware configuration, leading to improvement of overall efficiency of the manufacturing process.

Examples of the AI Used in the Manufacturing Support System

The following provides detailed examples of the AI computation unit 204.

a) Autoencoder

Figure 4A:
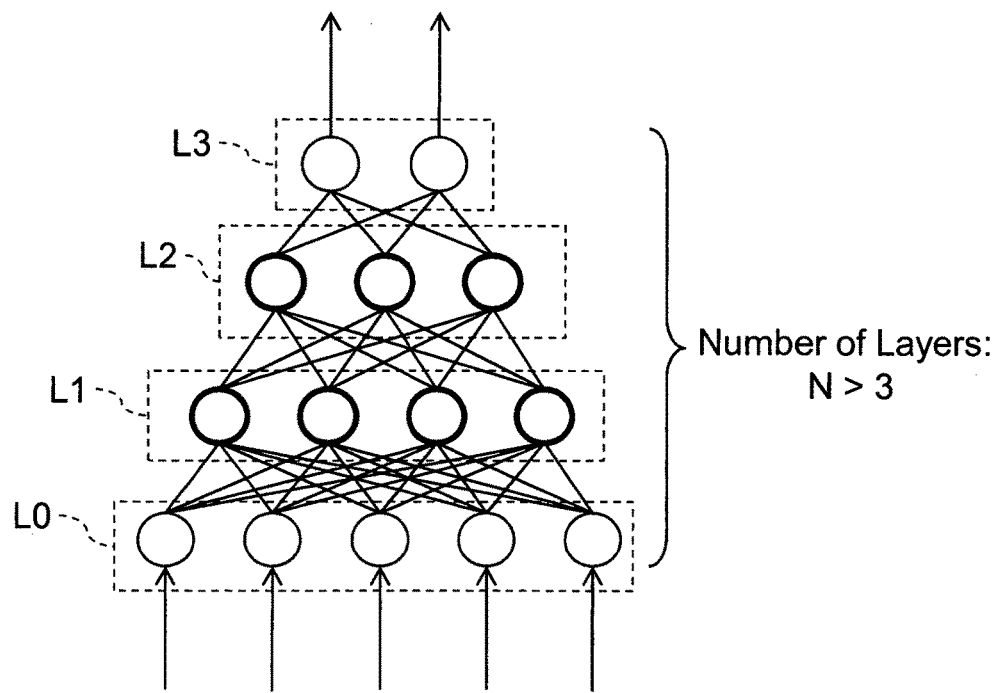
FIG. 4A shows an exemplary configuration of a neural network which may be trained using a deep learning technique.

In some examples, the AI computation unit 204 may comprise a neural network having a configuration as shown in FIG. 4A and the neural network may be trained using a known deep learning technique involving an autoencoder.

A neural network to be trained by a known deep learning technique may comprise more than three layers in total, including an input layer (e.g., layer L0 in FIG. 4A), two or more hidden layers (e.g., layers L1, L2 in FIG. 4A) and an output layer (e.g., layer L3 in FIG. 4A). Although FIG. 4A shows four layers, the neural network for deep learning may have more than four layers, e.g. more than two hidden layers. Further, each layer in the neural network for deep learning may have more number or less number of nodes than that shown in FIG. 4A.

The input layer of the neural network shown in FIG. 4A may include nodes that receive values included in or derivable from the object data obtained by the obtaining unit 10. For instance, in case the object data is image data of the object to be manufactured, the input layer may include nodes corresponding to pixels included in the image data. In other words, each node in the input layer may be configured to receive an intensity value of one of the pixels included in the image data. For color image data, multiple nodes in the input layer may correspond to multiple intensity values (e.g., intensity values for red, green and blue channels) of a single pixel of the image data.

In case the object data is a combination of 2D image data and corresponding depth map data of an object to be manufactured, the input layer may include input nodes corresponding to pixels of the 2D image data as well as input nodes corresponding to pixels of the depth map data.

Further, in case the object data is a 3D model of an object to be manufactured, the 3D model may be represented using volumetric representation, e.g. voxelization, so that the object data includes values that are readily input to input nodes of the input layer of the neural network as shown in FIG. 4A. A volumetric representation of a 3D model may reside in voxels in a 3D space (e.g. a cube with N×N×N voxels (N=2, 3, 4, ... )) and each voxel may take a value between 0 and 1, 0 indicating the voxel to be empty, while 1 indicating the voxel to be occupied by the 3D model. The input layer of the neural network may include input nodes corresponding to voxels in such a 3D space. In the examples where the object data is a 3D model of an object, the obtaining unit 10 may be further configured to generate a volumetric representation of the 3D model and provide the volumetric representation to the AI engine 20.

Regardless of the type of the object data, the input layer may further include one or more nodes corresponding to information relating to a material, processing and/or a size of the object to be manufactured, in the examples where such information is received by the AI engine 20. For example, different values may be assigned to different names of materials and an input node corresponding to the name of the material may receive the value assigned to the name of the material of the object. Alternatively or additionally, an input node may correspond to a characteristic of the material, e.g., color, stiffness, relative density, heat resistance, etc., and receive a value indicating the characteristic, for example. Further, in case one or more input nodes corresponding to processing of the object is provided in the input layer, the one or more input nodes may receive one or more values indicating the type of processing (e.g., sintering, soldering, welding etc.) and/or how elements of the object are assembled etc., for example. Further, in case an input node corresponding to a size of the object is provided in the input layer, the additional node may receive a value indicating the size of the object.

Figure 4B:
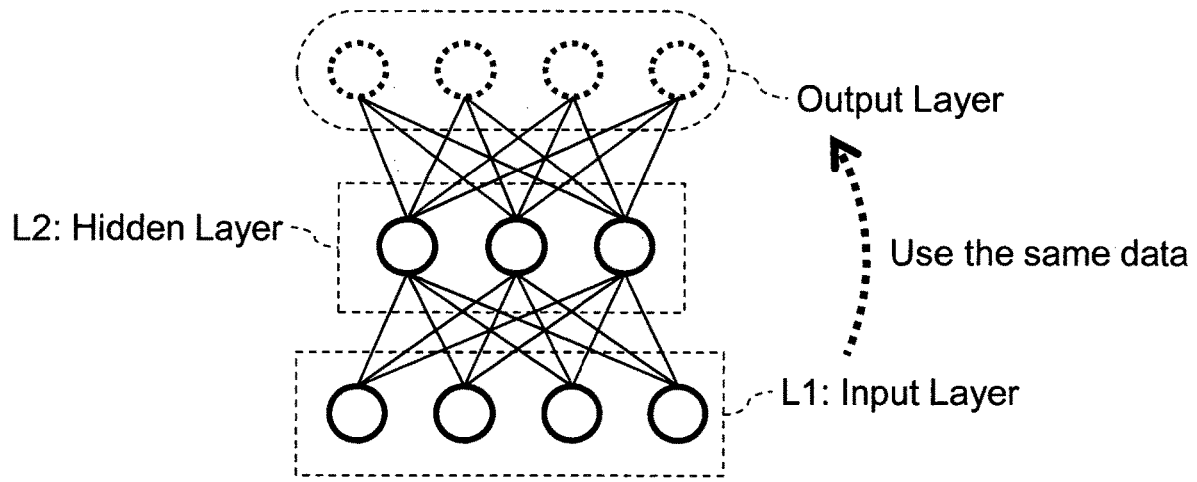
FIG. 4B shows how a hidden layer of the neural network shown in FIG. 4A can be trained in some examples.

When training the neural network as shown in FIG. 4A, weights of connections to each hidden layer of the neural network may be adjusted so as to build an autoencoder that learns a representation (e.g., encoding) for a set of data. For example, in order to train the hidden layer L2 shown in FIG. 4A, an autoencoder having a neural network shown in FIG. 4B may be constructed and trained. Referring to FIG. 4B, the layer L1 may be considered as an input layer connected to the hidden layer L2 and an output layer having the same number of nodes as the input layer L1 may be provided. It is noted that the layers L1 and L2 in FIG. 4B correspond to the layers L1 and L2 in FIG. 4A. The autoencoder shown in FIG. 4B may be trained using the input data to the input layer as the supervisory signal. In other words, the weights of the connections to the hidden layer L2 may be adjusted so that the output layer outputs the same data as the input data. Performing such training may result in the hidden layer of the autoencoder to represent compressed information of the input data, in other words, represent characteristics or features of the input data. The training of an autoencoder as shown in FIG. 4B may be iterated for each of the hidden layers of the neural network as shown in FIG. 4A.

Several techniques may be applied for improving robustness of an autoencoder. For example, partially corrupted input (e.g., input with added noise) may be used while training the autoencoder to recover the original undistorted input. Further, for example, sparsity may be imposed on the hidden layer (e.g., providing more nodes in the hidden layer than in the input layer) during training and the autoencoder may be trained so that only a specified percentage of nodes in the hidden layer are active. For further example, one or more nodes in the hidden layer may be made inactive during training.

The output layer of the neural network shown in FIG. 4A may include output nodes corresponding to possible sets of manufacturing process steps for manufacturing the object to be manufactured. For example, each output node may be configured to output a value representing the likelihood that the corresponding set of manufacturing process steps is appropriate for manufacturing the object. Accordingly, the output unit 206 of the machine learning device may output information indicating the set of manufacturing process steps corresponding to an output node with the highest value of likelihood. In some examples, the output unit 206 of the machine learning device may identify a specified (predetermined or predeterminable) number of output nodes which have the highest values of likelihood among all the output nodes and output information indicating the specified number of sets of manufacturing process steps corresponding to the identified output nodes. The output unit 206 may further output priorities of the specified number of sets of manufacturing process steps, based on the values of likelihood output by the identified output nodes. For example, the output unit 206 may output information indicating higher priority (in other words, preference and/or higher level of recommendation) for a set of manufacturing process steps corresponding to the identified output node with a higher value of output.

In the examples where the output unit 206 is further configured to output information indicating value(s) and/or value range(s) of one or more parameters relating to each of one or more steps included in the set, each possible set of manufacturing process steps corresponding to an output node may include or be associated with such value(s) and/or value range(s).

b) Convolutional Neural Network (CNN)

In some examples, the AI computation unit 204 may comprise a convolutional neural network (CNN) that is known as a neural network suitable for image recognition. Exemplary applications of a CNN to the AI computation unit 204 of the manufacturing support system will be described below with reference to FIGS. 5 to 7.

Figure 5:
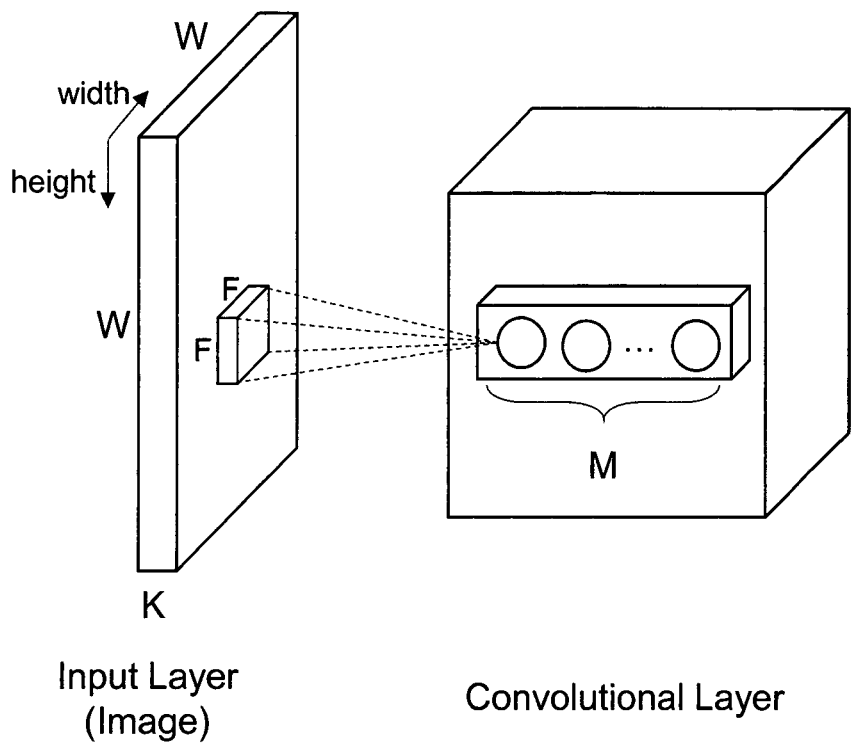
FIG. 5 shows a schematic diagram illustrating an exemplary input layer and an exemplary convolutional layer of a convolutional neural network (CNN).

FIG. 5 shows a schematic diagram illustrating an exemplary input layer and an exemplary convolutional layer of a CNN. In the CNN shown in FIG. 5, an input image having W×W (W=1, 2, 3, ... ) pixels for K (K=1, 2, 3, ... ) channels (e.g., three channels corresponding to Red, Green and Blue) can be input to the input layer. In this example, the input image may be an image of an object, such as a gear, to be manufactured (e.g. the object data obtained by the obtaining unit 10). An intensity value of a pixel for a channel can be considered as an input value to an input node of the input layer. In other words, the input layer may include W×W×K input nodes, each of which corresponding to an intensity value of a channel of a pixel.

Each node of the convolutional layer of the CNN shown in FIG. 5 may correspond to a filter having a size of F×F (F=1, 2, 3, ... ; F<W), applied to a part of the input image. As shown in FIG. 4, M (M=1, 2, 3, ... ) filters may be applied to the same part of the input image over the K channels. An output of each node in the convolutional layer may be represented as follows by equation (1):

$$y = f(\Sigma_{i=0}^{F \times F \times K - 1} w_i x_i + b) \quad (1)$$

where $x_i$ may represent an input value to an input node (e.g., an intensity value of a pixel for a channel within the region covered by the corresponding filter); $w_i$ may represent an adjustable weight for a connection between the node in the convolutional layer and the input node corresponding to $x_i$; and b may represent a bias parameter. The activation function f may be a rectified linear unit, f(x)=max(x, 0).

In some examples, each of the M filters may be applied to the whole area of the input image by sliding the filter with a stride of S pixel(s) in both width and height directions shown in FIG. 5. For each location of the M filters on the input image, M nodes corresponding to the M filters may be present in the convolutional layer. In case of S=1, the number of outputs of the convolutional layer may be W×W×M. The outputs of the convolutional layer may be considered as M images (corresponding to M filters) with a size of W×W.

The outputs of the convolutional layer may be subject to down-sampling by a max pooling operation. The max pooling operation may select the maximum value among a plurality of input values. The max pooling operation may be applied to each of the M images with a size of W×W, output from the convolutional layer as stated above.

Figure 6:
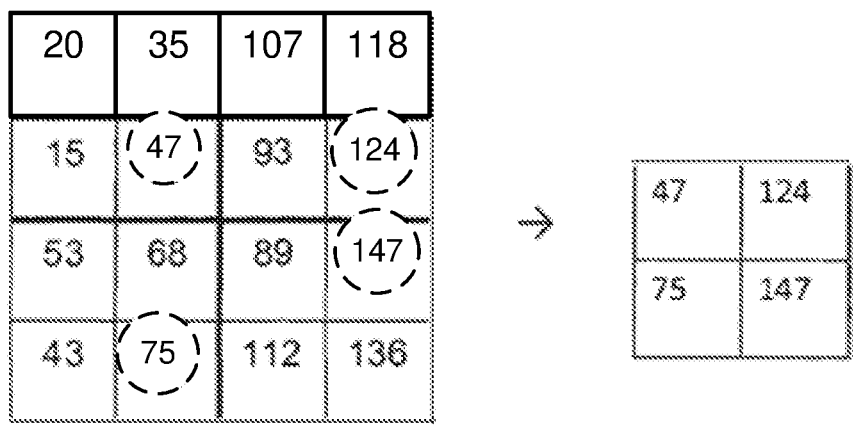
FIG. 6 shows a schematic diagram illustrating an exemplary max pooling operation.

FIG. 6 shows a schematic diagram illustrating an exemplary max pooling operation. In the exemplary max pooling operation as shown in FIG. 6, filters having a size of 2×2 may be applied to an input image (to the max pooling operation) with a stride of two pixels. This may result in an output image including pixels each of which has the maximum intensity value among the pixels of the input image within the corresponding filter. Each filter used in the max pooling operation may be considered as a node of a pooling layer comprised in a CNN.

The outputs of the pooling layer may be input to another convolutional layer. Alternatively, the outputs of the pooling layer may be input to a neural network called fully connected neural network, where each node of the fully connected neural network is connected to all the outputs (e.g. nodes) of the pooling layer. The outputs of the fully connected neural network may be connected either to another fully connected neural network or an output layer.

The output layer may include one or more nodes corresponding to one or more desired output parameters of the CNN. For example, in the exemplary embodiments, the output layer may include a plurality of output nodes, each of which corresponding to a possible set of manufacturing process steps for manufacturing the object, similar to the examples of output nodes of the neural network trained using an autoencoder shown in FIG. 4A as stated above. Further, as stated above in the examples using an autoencoder, each possible set of manufacturing process steps corresponding to an output node may include or be associated with value(s) and/or value range(s) of one or more parameters relating to each of one or more steps included in the set. Each output node may comprise a softmax function as the activation function. When the output layer includes two or more nodes, the CNN may be considered as solving a classification problem to classify the object in the input image into one of a specified (predetermined or predeterminable) number of groups.

Figure 7:
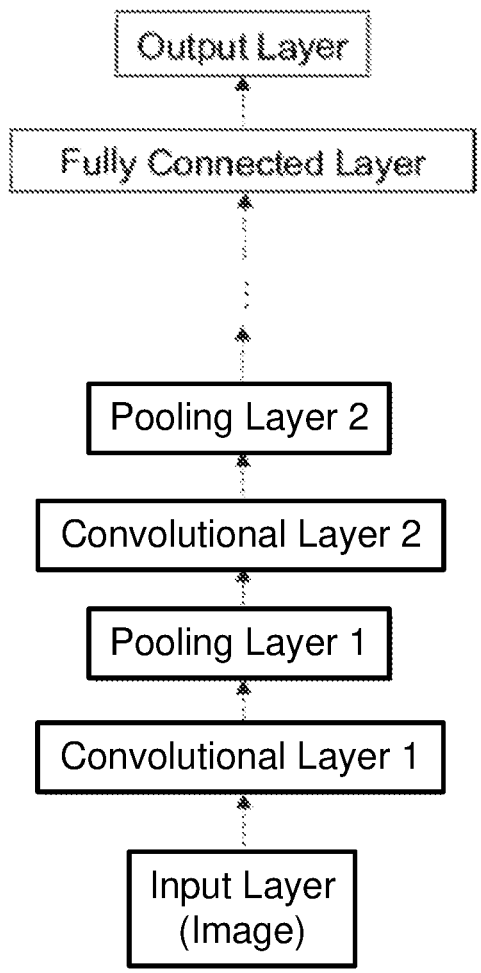
FIG. 7 shows an exemplary configuration of a CNN.

FIG. 7 shows an exemplary configuration of a CNN. The CNN as shown in FIG. 7 includes an input layer, a convolutional layer 1, a pooling layer 1, a convolutional layer 2, a pooling layer 2, a fully connected layer and an output layer. The convolutional layers 1, 2 and the pooling layers 1, 2 may have the configurations as explained above with reference to FIGS. 5 and 6. As also mentioned above, a CNN may include more pairs of a convolutional layer and a pooling layer. Further, a CNN may include a sequence of convolutional layers without having a pooling layer in between the adjacent convolutional layers, as long as the last convolutional layer of the sequence is connected to a pooling layer. Further, a CNN may include more than one fully connected layers right before the output layer.

In the examples where the AI computation unit 204 receives, in addition to the object data, information relating to a material, processing and/or a size of the object to be manufactured, one of the fully connected layers in the CNN comprised in the AI computation unit 204 may include one or more additional nodes configured to receive value(s) indicating such information. For example, different values may be assigned to different names of materials and an additional node corresponding to the name of the material may receive the value assigned to the name of the material of the object. Alternatively or additionally, an additional node may correspond to a characteristic of the material, e.g., color, stiffness, relative density, heat resistance, etc., and receive a value indicating the characteristic, for example. Further, one or more of additional nodes in one of the fully connected layers in the CNN may correspond to the type of processing (e.g., sintering, soldering, welding etc.) and/or how elements of the object are assembled etc., for example. Further, in case an additional node corresponding to a size of the object is provided in one of the fully connected layers in the CNN, the additional node may receive a value indicating the size of the object.

Further details of known CNN techniques which may be applied in connection with the present disclosure may be found in, for example, Okatani, "Deep Learning and Image Recognition, —Basics and Current Trends—" (in the Japanese language), Operations research as a management science research, 60(4), p. 198-204, The Operations Research Society of Japan, Apr. 1, 2015, and Anonymus, "Convolutional neural network", Wikipedia (URL: https://en.wikipedia.org/wiki/Convolutional_neural_network).

Although the above explanations on the CNN relate to the case where the object data is image data of an object to be manufactured, the CNN may be employed also in the examples where the object data is a 3D model or a combination of 2D image data and corresponding depth map data.

In case the object data is a 3D model, the 3D model may be represented using volumetric representation as mentioned above with respect to the neural network trained using an autoencoder (see FIGS. 4A and 4B). The input layer of the CNN may include input nodes corresponding to the voxels of the 3D space in which the 3D model is arranged. As stated above, each voxel may have a value between 0 and 1, 0 indicating the voxel to be empty, while 1 indicating the voxel to be occupied by the 3D model.

In case the object data is a combination of 2D image data and corresponding depth map data, the input layer of the CNN (see e.g., FIG. 5) may have a channel corresponding to the depth map data in addition to the channel(s) corresponding to the 2D image data.

Processing for Supporting Manufacturing a) Training of an AI

Figure 8:
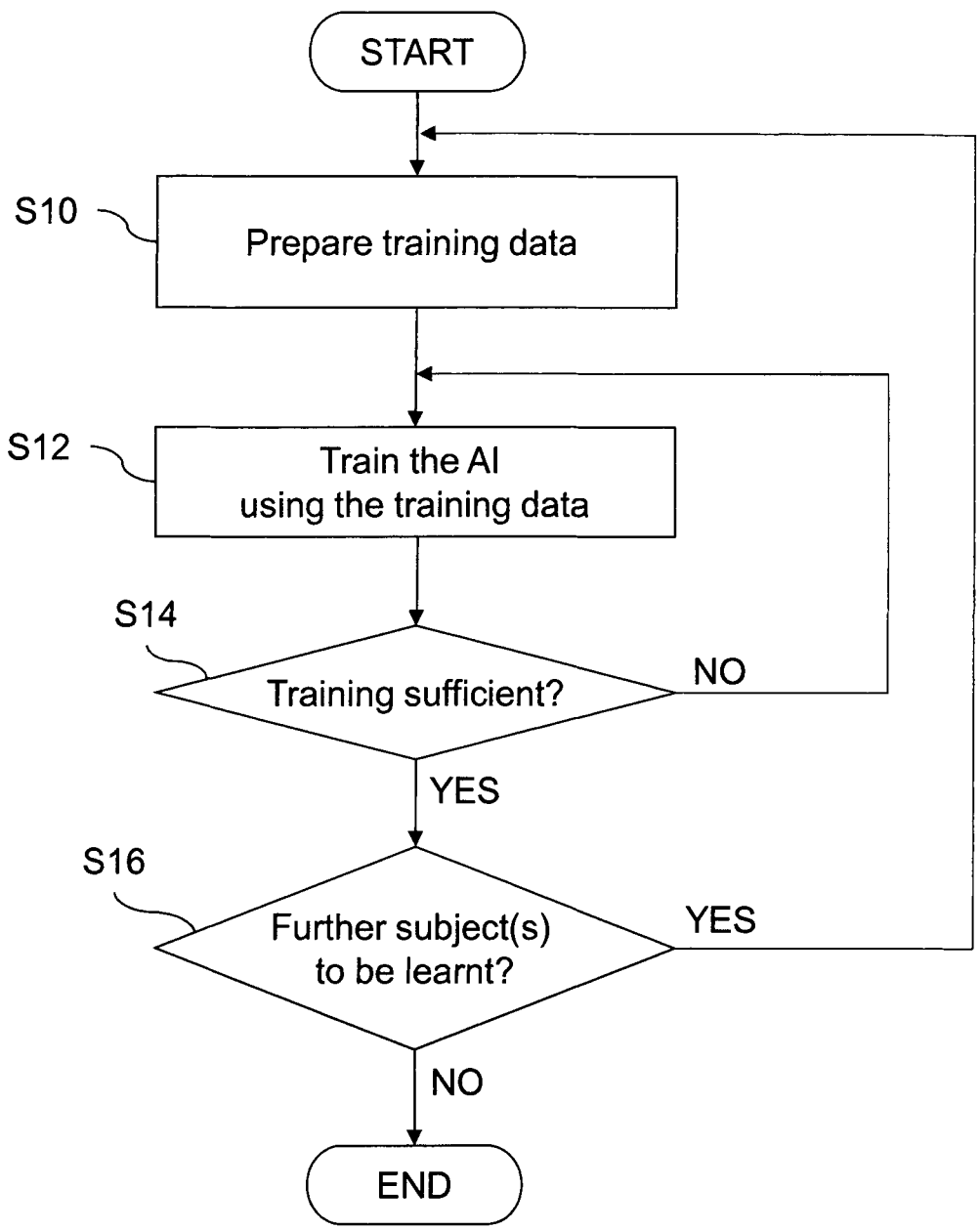
FIG. 8 shows a flowchart of exemplary processing for training an AI of a machine learning device.

FIG. 8 shows a flowchart of exemplary processing performed for training an AI implemented by the AI computation unit 204 of the machine learning device 200. The processing shown in FIG. 8 may be performed by the AI training unit 210 as shown in FIG. 1. The processing shown in FIG. 8 may start, for example, in response to an instruction from a user to start training the AI computation unit 204.

In step S10 of FIG. 8, training data may be prepared for training the AI computation unit 204. For example, the AI training unit 210 may obtain object data of an object and information indicating a set of manufacturing process steps for manufacturing the object. The AI training unit 210 may then generate an element of training data set, the element including a combination of the obtained object data and the information indicating the set of manufacturing process steps for manufacturing the object. The AI training unit 210 may generate a specified number of such elements of the training data set.

When preparing the training data in step S10 of FIG. 8, the object data may be obtained from a computer (not shown) or a storage device (not shown) connected to the AI training unit 210. Alternatively, the AI training unit 210 may be configured to generate the object data, in a manner similar to the obtaining unit 10 as described above with reference to FIG. 1. The information indicating a set of manufacturing process steps may be, for example, identification information indicating the set of manufacturing process steps. Different sets of manufacturing process steps may be defined for different objects and may be assigned respective identification information.

In some specific examples, the AI training unit 210 may receive images of a particular kind of gear(s) (as exemplary object data), and information indicating a set of manufacturing process steps for manufacturing that kind of gear(s) (e.g., the process steps including cutting, drilling, hobbing, tooth chamfering and shaving). In these specific examples, each element of the training data set may be a combination of an image of a gear of the particular kind and the information indicating the set of manufacturing process steps for manufacturing the particular kind of gear.

In step S12 of FIG. 8, the AI implemented by the AI computation unit 204 may be trained using the training data generated in step S10. For example, the AI training unit 210 may retrieve data structure of an autoencoder (see e.g., FIGS. 4A and 4B) or a CNN (see e.g., FIGS. 5 to 7) from the neural network DB 80 and training the autoencoder or the CNN as the AI computation unit 204, by adjusting the weights of the autoencoder or of the convolutional layer(s) and the fully connected layer(s) of the CNN, as described above with reference to FIGS. 4A to 7. For adjusting the weights, the object data in the training data set may be used as inputs to the autoencoder or the CNN and the corresponding information indicating the set of manufacturing process steps may be used as supervisory signals, for example. In case of the specific examples as mentioned above with respect to step S10, where each element of the generated training data set includes an image of a gear of the particular kind and the information indicating the set of manufacturing process steps for manufacturing the particular kind of gear, the images of the gear(s) may be input to the autoencoder or the CNN and the weights may be adjusted using, as supervisory signals, the information indicating the set of manufacturing process steps for manufacturing that particular kind of gear. By the training step S12, the AI of the AI computation unit 204 may be trained to output information indicating one or more sets of manufacturing process steps for manufacturing an object data represented by object data that is received as an input.

After step S12, the AI training unit 210 may determine whether or not the training is sufficient in step S14 of FIG. 8. In some examples, the AI training unit 210 may use, for the determination of step S14, test data including combinations of object data and information indicating a set of manufacturing process steps. The test data set may be prepared in a manner analogous to that for preparing the training data set in step S10. In some examples, the AI training unit 210 may use a part of the training data prepared in step S10 for training the AI computation unit 204 in step S12 and the remaining part of the training data prepared in step S10 as the test data for determining whether the training is sufficient in step S14. In the examples of using the test data in step S14, the AI training unit 210 may input the object data in the test data to the AI computation unit 204 and compare the outputs from the AI computation unit 204 for the object data with the known set of manufacturing process steps to manufacture the object represented by the object data. The AI training unit 210 may, for example, determine that the training is sufficient if a ratio of the number of correct outputs from the AI computation unit 204 over the total number of instances of the object data in the test data exceeds a predetermined threshold. Alternatively, for example, the AI training unit 210 may determine that the training is sufficient if the number of correct outputs from the AI computation unit 204 exceeds a predetermined threshold. When it is determined that the training is not sufficient (NO in step S14), the processing may return to step S12. When it is determined that the training is sufficient (YES in step S14), the processing may proceed to step S16.

In step S16, the AI training unit 210 may determine whether or not there is (are) further subject(s) to be learnt by the AI computation unit 204. For example, in case the AI computation unit 204 is desired to determine sets of manufacturing process steps for more than one kinds of objects and training relating to at least one of said more than one kind of objects has not yet been generated in step S10, the AI training unit 210 may determine that there is (are) further subject(s) to be learnt by the AI computation unit 204. When it is determined that there is (are) further subject(s) to be learnt (YES in step S16), the processing may return to step S10. Otherwise (NO in step S16), the processing shown in FIG. 8 may end.

b) Processing Using the Trained AI

Figure 9:
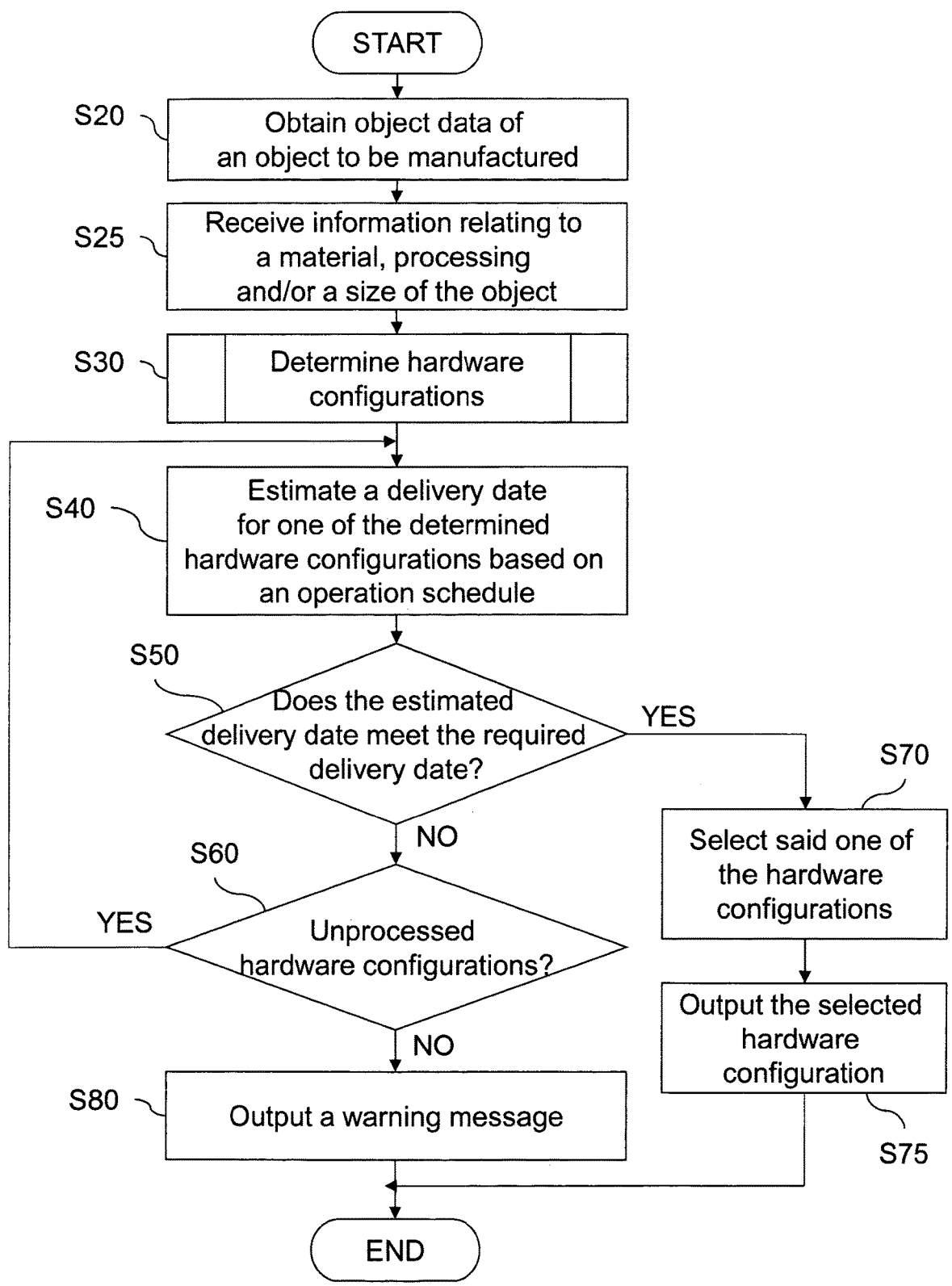
FIG. 9 shows a flowchart of exemplary processing performed by the manufacturing support system.

FIG. 9 shows a flowchart of exemplary processing performed by the manufacturing support system. The processing shown in FIG. 9 may start, for example, in response to an instruction from a user to start the processing shown in FIG. 9.

In step S20, the obtaining unit 10 may obtain object data of an object to be manufactured. In some examples, the obtaining unit 10 may obtain the object data from a computer or a storage device connected to the obtaining unit 10. In other examples, the obtaining unit 10 may generate the object data. In case the object data is image data, the obtaining unit 10 may generate the object data by capturing an image of the object using an imaging device such as a camera. In case the object data is a 3D model, the obtaining unit 10 may generate the object data by scanning the object by a known 3D scanner or with a known software for 3D modelling. In case the object data is a combination of 2D image data and corresponding depth map data, the obtaining unit 10 may generate the object data by capturing the object by RGB-D sensors, for example.

If necessary, in step S20, the obtaining unit 10 may further process the object data to be suitable as an input to the AI engine 20. For example, in case the object data is a 3D model and the AI computation unit 204 of the AI engine 20 comprises an autoencoder or a CNN as described above with reference to FIGS. 4A to 7, the obtaining unit 10 may generate a volumetric representation of the 3D model.

The object data (with or without further processing) may be provided to the AI engine 20.

In step S25, the AI engine 20 may receive information relating to a material, processing and/or a size of the object to be manufactured. The information relating to the material and/or the size of the object may be received from a user via an input device, for example. Alternatively or additionally, the information relating to the material and/or the size of the object may be received from a computer or a storage device connected to the AI engine 20.

In step S30, the AI engine 20 determines a plurality of hardware configurations for a manufacturing system for manufacturing the object.

Figure 10:
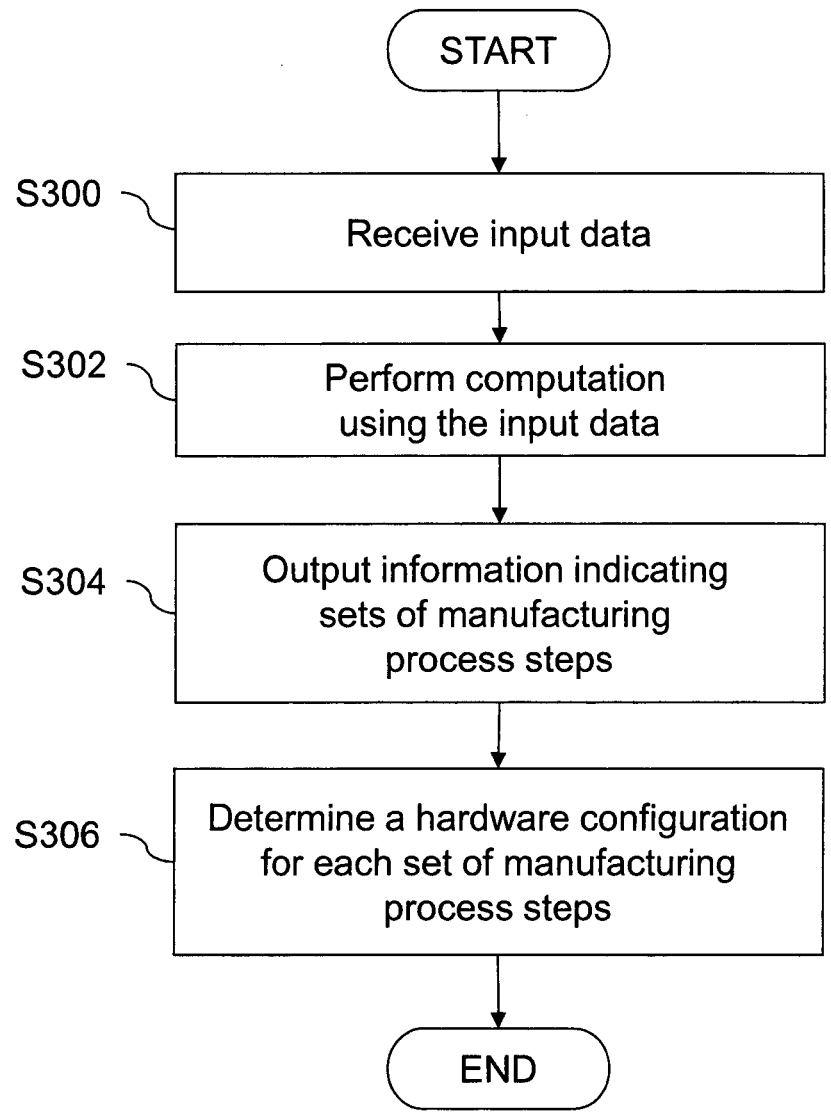
FIG. 10 shows a flowchart of exemplary processing performed by an AI engine.

FIG. 10 shows an example of detailed processing of step S30 of FIG. 9. When step S30 of FIG. 9 is started, the processing shown in FIG. 10 may start.

In step S300 of FIG. 10, the receiving unit 202 of the machine learning device 200 comprised in the AI engine 20 may receive input data. The input data may include the object data obtained in step S20 of FIG. 9 and the information relating to the material and/or size of the object received in step S25 of FIG. 9.

In step S302 of FIG. 10, the AI computation unit 204 may perform computation using the input data received by the receiving unit 202 at step S300. For example, when an autoencoder (see e.g., FIGS. 4A and 4B) or a CNN (see e.g., FIGS. 5 to 7) is employed as the AI computation unit 204, the AI computation unit 204 may perform computation by inputting the received input data to the autoencoder or the CNN and obtain an output from the autoencoder or the CNN.

In step S304, the output unit 206 may output, to the hardware information processing unit 212, information indicating a plurality of sets of manufacturing process steps based on the computation performed in step S302. For example, in case the AI computation unit 204 comprises a neural network (e.g., an autoencoder or a CNN) with output nodes each of which corresponds to a possible set of manufacturing process steps, the output unit 206 may identify a specified number of output nodes which have the highest values of likelihood that the corresponding sets of manufacturing process steps are appropriate for manufacturing the object. The output unit 206 may then output information indicating the specified number of sets of manufacturing process steps corresponding to the identified output nodes. In some examples, the output unit 206 may further output, in step S304, information indicating priorities (e.g., preferences and/or levels of recommendation) among the specified number of sets of manufacturing process steps, based on the values of likelihood output by the identified output nodes.

In step S306, the hardware information processing unit 212 determines a hardware configuration for each set of manufacturing process steps. For example, the hardware information processing unit 212 may access the hardware information DB 30 (see e.g., the table shown in FIG. 3) to identify a hardware element or a combination of hardware elements required for performing each of one or more manufacturing process steps included in the set of manufacturing process steps.

After step S306, the processing shown in FIG. 10 may end. The processing of the manufacturing support system may then proceed to step S40 of FIG. 9.

Referring again to FIG. 9, after determination of hardware configurations by the AI engine 20 in step S30, the selection unit 40 may estimate a delivery date of the object for one of the determined hardware configurations based on an operation schedule of available hardware elements in step S40. The operation schedule may be obtained from the hardware information DB 30. For example, the selection unit 40 may first consider a hardware configuration with the highest priority determined by the AI engine 20 and check the operation schedule in the hardware information DB 30 to determine whether (or when) each hardware element included in the hardware configuration is (or will be) ready for use. Based on whether or when each hardware element is or will be ready for use and on the set of manufacturing process steps corresponding to the hardware configuration, the selection unit 40 may estimate a delivery date of the object for the hardware configuration.

In step S50, a determination may be made as to whether the estimated delivery date meets a required delivery date. The required delivery date may be obtained from a user via an input device or from a computer or a storage device connected to the selection unit 40.

If the estimated delivery date meets the required delivery date (YES in step S50), said one of the hardware configurations may be selected by the selection unit 40 in step S70. After step S70, the output unit 60 may output the selected hardware configuration in step S75 and the processing shown in FIG. 9 may end.

If the estimated delivery date does not meet the required delivery date (NO in step S50), the processing proceeds to step S60 and the selection unit 40 determines whether or not any hardware configuration that has not yet been processed by the selection unit 40. If there is an unprocessed hardware configuration (YES in step S60), the processing may return to step S40. In step S40, the delivery date of the object for a determined hardware configuration with the next highest priority may be estimated, for example.

If there is no unprocessed hardware configuration (NO in step S60), the output unit 60 may output a warning message in step S80. The warning message may indicate, for example, that none of the hardware configurations determined by the AI engine 20 can meet the required delivery date. Alternatively or in addition, the warning message may indicate the estimated delivery dates determined for all the determined hardware configurations.

The processing in FIG. 9 may end after step S80.

c) Processing Using the Determined Hardware Configuration

In some examples, the manufacturing support system may generate a control program for the determined hardware configuration by the control information generation unit 50.

Figure 11:
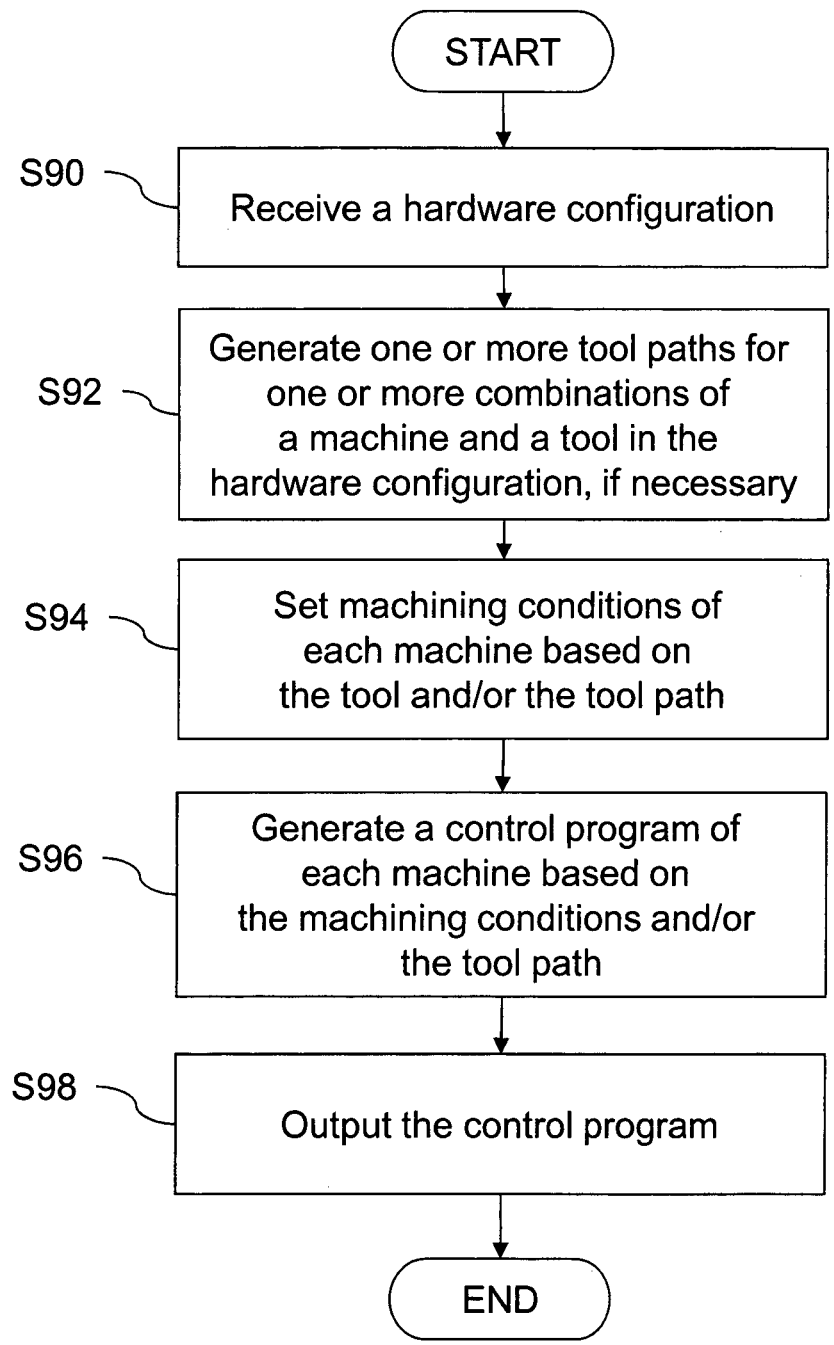
FIG. 11 shows a flowchart of exemplary processing performed for generating a control program of a manufacturing system.

FIG. 11 shows a flowchart of exemplary processing performed by the control information generation unit 50. The control information generation unit 50 may start the processing of FIG. 11 when the selection unit 40 has selected a hardware configuration, for example. Alternatively, for example, the control information generation unit 50 may start the processing of FIG. 11 when a user has instructed via an input device to start the processing of FIG. 11.

In step S90, the control information generation unit 50 may receive a hardware configuration. For example, the control information generation unit 50 may receive, from the selection unit 40, a hardware configuration selected by the selection unit 40. In case the AI engine 20 is configured to determine only one hardware configuration, the control information generation unit 50 may receive the determined hardware configuration from the AI engine 20.

In step S92, the control information generation unit 50 may generate one or more tool paths for one or more combinations of a machine and a tool in the hardware configuration, if necessary. For example, in case such a combination of a machine and a tool that the tool may move along a path (e.g., a milling machine and a milling cutter) is included in the hardware configuration, the control information generation unit 50 may generate a tool path for that combination. In case, for example, such a combination of a machine and a tool that the tool does not move along a path is included in the hardware configuration, no tool path may be necessary to be generated for that combination in step S92.

The tool path may be generated, for example, using a 3D model of the object to be manufactured. In the examples where the object data is a 3D model of the object, the control information generation unit 50 may receive the object data being the 3D model from the obtaining unit 10 in order for generating the tool path(s). In the examples where the object data is not a 3D model of the object (e.g., image data or RGB-D data of the object), the control information generation unit 50 may receive a 3D model of the object generated by a device (not shown) connected to the control information generation unit 50. Alternatively, the control information generation unit 50 may generate a 3D model of the object from the object data and any additional information (e.g., information concerning the shape and/or size of the object) necessary to generate a 3D model of the object. The additional information may, for example, be obtained from the user via an input device and/or from a computer (not shown) or storage device (not shown) connected to the control information generation unit 50.

In step S94, the control information generation unit 50 may set machining conditions of each machine based on the tool and/or the tool path. The machining conditions may include values of control parameters required for operating the machine. The control parameters may include, but are not limited to, speed and/or acceleration of tool movement, rotation frequency of the tool and/or the workpiece, orientation of the tool and/or the workpiece, etc. For example, in case the machine is an NC lathe, the machining conditions may include a cutting speed (e.g., rotational speed of a workpiece), a feed speed of the cutting tool and/or a cutting depth. The machining conditions may be determined using known techniques depending on the type of the machine. The known techniques for determining the machining conditions may employ machine learning techniques, for example, as disclosed by JP 2017-62695A and JP 2017-30152A.

In step S96, the control information generation unit 50 may generate a control program of each machine based on the machining conditions and/or the tool path. The control program may include machine-readable instructions that enable the machine to operate under the machining conditions and, if applicable, to move the tool along the tool path. For a specific example, in case the machine is an NC lathe and the machining conditions include a cutting speed, a feed speed of the cutting tool and a cutting depth, the machine-readable instructions of the generated control program may be instructions that a controller of the NC lathe can read and that instruct the controller of the NC lathe to output control signals for the NC lathe to operate with the cutting speed, the feed speed of the cutting tool and the cutting depth as included in the machining conditions.

In step S98, the control information generation unit 50 may provide the control program to the output unit 60. The control program may be output by the output unit 60.

After step S98, the processing shown in FIG. 11 may end.

The processing shown in FIG. 11 is a mere example of the processing that may be performed by the control information generation unit 50. For instance, in some other examples, step S96 of generating a control program may be skipped and the machining conditions may be output instead of a control program.

Variations

It should be appreciated by those skilled in the art that the exemplary embodiments and their variations as described above with reference to FIGS. 1 to 11 are merely exemplary and other embodiments and variations may exist.

For example, in the exemplary embodiments and examples described above, the AI computation unit 204 of the machine learning device determines at least one set of manufacturing process steps for manufacturing the object and the hardware information processing unit 212 determines a hardware configuration of the manufacturing system with reference to an information table stored in the hardware information DB 30, such as the one shown in FIG. 3.

In another exemplary embodiment and examples, the AI computation unit 204 of the machine learning device 200 may determine not only at least one set of manufacturing process steps but also the hardware configuration of the manufacturing system. In such an exemplary embodiment and examples, the AI engine 200 does not need to comprise the hardware information processing unit 212.

In the exemplary embodiment and examples where the AI computation unit 204 determines the hardware configuration as well as the manufacturing process steps, the AI computation unit 204 may be trained to output a hardware configuration and the manufacturing process steps based on a computation using the object data as an input. The object data may be analogous to that used in the exemplary embodiments and examples described above with reference to FIGS. 1 to 11. Further, similarly to the exemplary embodiments and examples described above with reference to FIGS. 1 to 11, the AI computation unit 204 may further use information relating to a material, processing and/or a size of the object as a part of the input. Further, the AI computation unit 204 may comprise a neural network, for example, an autoencoder (see FIGS. 4A and 4B) or a CNN (see FIGS. 5 to 7).

FIG. 12 shows an example of an output in the exemplary embodiment and examples where the AI computation unit 204 determines the hardware configuration as well as the manufacturing process steps. As shown in FIG. 12, the output may include manufacturing process steps for manufacturing the object (e.g. a gear) as well as a combination of a machine, a tool and machining conditions required for each manufacturing process steps. When training the AI computation unit 204, a specified number of possible outputs directed to different sets of manufacturing process steps and corresponding hardware configurations may be generated, for example.

Identification information may be assigned to each possible output and output nodes corresponding to the possible outputs may be provided in a neural network comprised in the AI computation unit 204. An element of the training data set for training the AI computation unit 204 may be a combination of the identification number of a possible output and object data of an object to be manufactured. The processing of training the AI computation unit 204 may be performed according to the flowchart shown in FIG. 8, for example.

The processing performed by the manufacturing system in the exemplary embodiment and examples where the AI computation unit 204 determines the hardware configuration as well as the manufacturing process steps may follow the flowchart shown in FIG. 9. When determining the hardware configurations in step S30, however, the computation performed by the AI computation unit 204 using the input data (e.g., object data and optionally information relating to a material, processing and/or size of the object) may already determine the hardware configurations along with the sets of manufacturing process steps, without referring to the hardware information DB 30 for an information table such as the one shown in FIG. 3.

In yet another exemplary embodiment and examples, the AI computation unit 204 of the machine learning device 200 may determine a hardware configuration of the manufacturing system for manufacturing the object, without identifying the manufacturing process steps. In such an exemplary embodiment and examples, an output from the manufacturing support system may include only one or more hardware configurations, e.g. list of machine(s) and/or tool(s) necessary for manufacturing the object. In this case, the AI computation unit 204 may be trained using object data of one or more objects and possible outputs, each of which including a hardware configuration.

Further, although the exemplary embodiments and various examples above are described in relation to manufacturing process steps involving machining a workpiece, the exemplary embodiments and various examples above may be applied analogously to manufacturing process steps involving processing other than machining, for example, molding, casting, heat treatment and/or surface finishing. For instance, the table shown in FIG. 3 and/or an exemplary output shown in FIG. 12 may include a quench hardening step that may be performed, e.g. after a shaving step, for manufacturing a gear. The machining conditions for a quench hardening step may include, for example, a temperature control table etc. Further, for example, the manufacturing process steps may relate to steps for forming a die or mold by machining and to steps for forming the object to be manufactured by casting or molding using the die or mold.

Hardware for Implementing the Manufacturing Support System

The various examples of the AI engine 20 and of the units included in the manufacturing support system as described above may be implemented using a computer.

Figure 13:
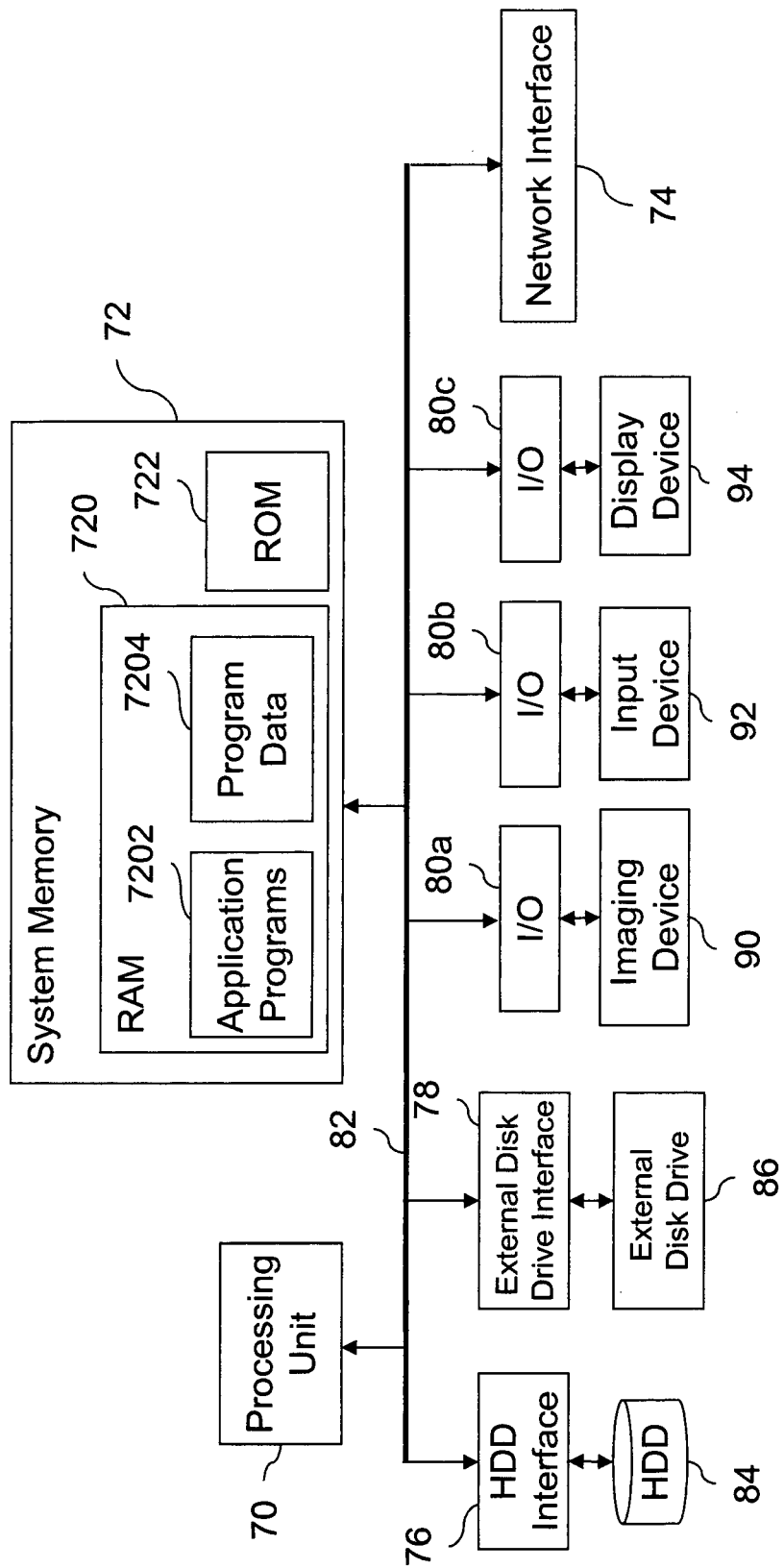
FIG. 13 shows an exemplary hardware configuration of a computer that may be used to implement the manufacturing support system.

FIG. 13 shows an exemplary hardware configuration of a computer that may be used to implement the exemplary AI engine 20 and/or any one of the units included in the manufacturing support system. The computer shown in FIG. 13 includes a processing unit 70, a system memory 72, a network interface 74, a hard disk drive (HDD) interface 76, an external disk drive interface 78 and input/output (I/O) interfaces 80. These components of the computer are coupled to each other via a system bus 82. The processing unit 70 may perform arithmetic, logic and/or control operations by accessing the system memory 72. The processing unit 70 may implement the processors of the exemplary AI engine and/or any one of the units included in the manufacturing support system described above. The system memory 72 may store information and/or instructions for use in combination with the processing unit 70. The system memory 72 may include volatile and non-volatile memory, such as a random access memory (RAM) 720 and a read only memory (ROM) 722. A basic input/output system (BIOS) containing the basic routines that helps to transfer information between elements within the computer, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for encrypting and/or decrypting a document, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer may also include an imaging device 90 such as a camera, an input device 92 such as mouse and/or keyboard and a display device 94 such as liquid crystal display. The imaging device 90, the input device 92 and the display device 94 may be connected to the system bus 82 via I/O interfaces 80a to 80c.

In addition or as an alternative to an implementation using a computer as shown in FIG. 13, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A manufacturing support system comprising:
an obtaining unit configured to obtain object data of an object to be manufactured;
an artificial intelligence, AI, engine configured to receive the object data as an input and to determine:
manufacturing process steps to be carried out by a manufacturing system for manufacturing the object; and
a hardware configuration of the manufacturing system for manufacturing the object with reference to information relating to available hardware for the manufacturing system; and
an output unit configured to output the determined manufacturing process steps and the determined hardware configuration,
wherein the information relating to available hardware for the manufacturing system includes information indicating, for at least part of possible manufacturing process steps, at least one hardware element that is available and that is required to perform the manufacturing process step, wherein the AI engine comprises:
  a machine learning device that is configured to:
    receive the object data as an input;
    perform computation using the received object data; and
    output information indicating at least one set of manufacturing process steps for manufacturing the object based on the computation; and
  a hardware information processing unit that is configured to determine the hardware configuration of the manufacturing system by identifying, with reference to the information relating to available hardware, at least one hardware element required to perform each of one or more steps included in said at least one set of manufacturing process steps for manufacturing the object, wherein the machine learning device comprises a neural network configured to perform the computation using the received object data, the neural network comprising an output layer including output nodes corresponding to possible sets of manufacturing process steps for manufacturing the object to be manufactured, each of the output nodes being configured to output a value representing a likelihood that the corresponding set of manufacturing process steps is appropriate for manufacturing the object, wherein the neural network has been trained using training data including object data of one or more objects and information indicating sets of manufacturing process steps for manufacturing the one or more objects, wherein the machine learning device is further configured to, for outputting the information indicating at least one set of manufacturing process steps for manufacturing the object based on the computation:
  identify a specified number of output nodes which have the highest values of likelihood that the corresponding sets of manufacturing process steps are appropriate for manufacturing the object; and
  output information indicating the sets of manufacturing process steps corresponding to the specified number of identified output nodes.

2. The manufacturing support system according to claim 1, wherein the AI engine is further configured to determine a value or a value range for a parameter relating to each of one or more steps included in the manufacturing process steps, and
  wherein the output unit is further configured to output the determined value or value range.

3. The manufacturing support system according to claim 1,
  wherein training of the neural network is performed according to deep learning technique.

4. The manufacturing support system according to claim 1, further comprising:
  a control information generation unit configured to generate control information for controlling the manufacturing system with the determined hardware configuration based on the object data and/or the determined hardware configuration.

5. The manufacturing support system according to claim 1, wherein the obtaining unit is further configured to obtain information relating to a material, processing and/or a size of the object to be manufactured, and wherein the AI engine is further configured to:
  receive, as a part of the input, the information relating to the material, the processing and/or the size of the object to be manufactured; and
  determine the hardware configuration further using the information relating to the material, the processing and/or the size of the object to be manufactured.

6. The manufacturing support system according to claim 1, wherein the information relating to available hardware includes information indicating an operation schedule for available hardware elements,
  wherein the AI engine is configured to determine more than one hardware configuration,
  wherein the manufacturing support system further comprises:
    a selection unit configured to select one of said more than one hardware configuration based on a required delivery time for the object and the operation schedule, and
  wherein the output unit is configured to output the selected one of said more than one hardware configuration.

7. The manufacturing support system according to claim 6, wherein the AI engine is further configured to determine priorities among said more than one hardware configuration, and
  wherein the selection unit is configured to select one of said more than one hardware configuration further based on the priorities among said more than one hardware configuration.

8. A computer-implemented method for supporting manufacturing, the method comprising:
  obtaining object data of an object to be manufactured;
  receiving, by an artificial intelligence, AI, engine, the object data as an input;
  determining, by the AI engine, manufacturing process steps to be carried out by a manufacturing system for manufacturing the object;
  determining, by the AI engine, a hardware configuration of the manufacturing system for manufacturing the object with reference to information relating to available hardware for the manufacturing system; and
  outputting the determined manufacturing process steps and the determined hardware configuration,
  wherein the information relating to available hardware for the manufacturing system includes information indicating, for at least part of possible manufacturing process steps, at least one hardware element that is available and that is required to perform the manufacturing process step,
  wherein said determining of the manufacturing process steps is performed by a machine learning device comprised in the AI engine, said determining of the manufacturing process steps comprises:
    receiving the object data as an input;
    performing computation using the received object data; and
    outputting information indicating at least one set of manufacturing process steps for manufacturing the object based on the computation,
  wherein said determining of the hardware configuration of the manufacturing system is performed by identifying, with reference to the information relating to available hardware, at least one hardware element required to perform each of one or more steps included in the at least one set of manufacturing process steps for manufacturing the object, wherein the machine learning device comprises a neural network configured to perform the computation using the received object data, the neural network comprising an output layer including output nodes corresponding to possible sets of manufacturing process steps for manufacturing the object to be manufactured, each of the output nodes being configured to output a value representing a likelihood that the corresponding set of manufacturing process steps is appropriate for manufacturing the object, wherein the method further comprises:

training the neural network using training data including object data of one or more objects and information indicating sets of manufacturing process steps for manufacturing the one or more objects, and wherein said outputting of the information indicating at least one set of manufacturing process steps for manufacturing the object based on the computation comprises:

identifying a specified number of output nodes which have the highest values of likelihood that the corresponding sets of manufacturing process steps are appropriate for manufacturing the object; and outputting information indicating the sets of manufacturing process steps corresponding to the specified number of identified output nodes.

9. The method according to claim 8, further comprising:

determining, by the AI engine, a value or a value range for a parameter relating to each of one or more steps included in the manufacturing process steps; and outputting the determined value or value range.

10. The method according to claim 8, wherein said training of the neural network is performed according to deep learning technique.

11. The method according to claim 8, further comprising:

generating control information for controlling the manufacturing system with the determined hardware configuration based on the object data and/or the determined hardware configuration.

12. The method according to claim 8, further comprising:

obtaining information relating to a material, processing and/or a size of the object to be manufactured, wherein the AI engine further receives the information relating to the material, the processing and/or the size of the object to be manufactured, and wherein the AI engine determines the hardware configuration of the manufacturing system further using the information relating to the material, the processing and/or the size of the object to be manufactured.

13. The method according to claim 8, wherein the information relating to available hardware includes information indicating an operation schedule for available hardware elements, wherein more than one hardware configuration is determined by the AI engine, wherein the method further comprises:

selecting one of said more than one hardware configuration based on a required delivery time for the object and the operation schedule, and wherein the selected one of said more than one hardware configuration is output as the determined hardware configuration.

14. The method according to claim 13, wherein the AI engine further determines priorities among said more than one hardware configuration, and wherein said selecting one of said more than one hardware configuration is further based on the priorities among said more than one hardware configuration.

15. A computer program product comprising computer-readable instructions that, when loaded and run on a computer, cause the computer to perform a method comprising:

obtaining object data of an object to be manufactured;

receiving, by an artificial intelligence, AI, engine, the object data as an input;

determining, by the AI engine, manufacturing process steps to be carried out by a manufacturing system for manufacturing the object;

determining, by the AI engine, a hardware configuration of the manufacturing system for manufacturing the object with reference to information relating to available hardware for the manufacturing system; and outputting the determined manufacturing process steps and the determined hardware configuration, wherein the information relating to available hardware for the manufacturing system includes information indicating, for at least part of possible manufacturing process steps, at least one hardware element that is available and that is required to perform the manufacturing process step, wherein said determining of the manufacturing process steps is performed by a machine learning device comprised in the AI engine, said determining of the manufacturing process steps comprises:

receiving the object data as an input;

performing computation using the received object data; and outputting information indicating at least one set of manufacturing process steps for manufacturing the object based on the computation, wherein said determining of the hardware configuration of the manufacturing system is performed by identifying, with reference to the information relating to available hardware, at least one hardware element required to perform each of one or more steps included in the at least one set of manufacturing process steps for manufacturing the object, wherein the machine learning device comprises a neural network configured to perform the computation using the received object data, the neural network comprising an output layer including output nodes corresponding to possible sets of manufacturing process steps for manufacturing the object to be manufactured, each of the output nodes being configured to output a value representing a likelihood that the corresponding set of manufacturing process steps is appropriate for manufacturing the object, wherein the method further comprises:

training the neural network using training data including object data of one or more objects and information indicating sets of manufacturing process steps for manufacturing the one or more objects, and wherein said outputting of the information indicating at least one set of manufacturing process steps for manufacturing the object based on the computation comprises:

identifying a specified number of output nodes which have the highest values of likelihood that the corresponding sets of manufacturing process steps are appropriate for manufacturing the object; and outputting information indicating the sets of manufacturing process steps corresponding to the specified number of identified output nodes.

* * * * *